United States Patent [19]

Schuetz et al.

[11] Patent Number: 4,864,002

[45] Date of Patent: * Sep. 5, 1989

[54] PROCESS FOR PREPARING COMPATIBILIZED THERMOPLASTIC POLYMER BLENDS AND COMPOSITIONS THEREOF

[75] Inventors: James E. Schuetz; Ronald W. Hohlfeld; Brenda C. Meridith, all of Midland, Mich.

[73] Assignee: The Dow Chemical Company, Midland, Mich.

[*] Notice: The portion of the term of this patent subsequent to May 20, 2003 has been disclaimed.

[21] Appl. No.: 723,124

[22] Filed: Apr. 15, 1985

Related U.S. Application Data

[63] Continuation-in-part of Ser. No. 565,790, Dec. 27, 1983, abandoned.

[51] Int. Cl.[4] ............................................. C08L 39/04

[52] U.S. Cl. .................................. 525/204; 525/186; 525/239; 525/240; 525/241; 525/375; 525/931

[58] Field of Search ............... 525/204, 931, 186, 239, 525/241, 73, 240, 68, 132, 375

[56] References Cited

U.S. PATENT DOCUMENTS

| | | | |
|---|---|---|---|
| 3,509,235 | 4/1970 | Riemhofer et al. | 525/204 |
| 4,474,923 | 10/1984 | Keskey et al. | 524/808 |
| 4,590,241 | 5/1986 | Hohlfeld | 525/204 |

*Primary Examiner*—John C. Bleutge
*Assistant Examiner*—A. Carrillo

[57] ABSTRACT

A process for preparing a thermoplastic polymer blend of two normally incompatible polymers by treating one polymer such that it contains repeating units of pendant cyclic iminoether groups and treating the other polymer such that it contains coreactive groups which are capable of reacting with the iminoether group to form linkages between the polymers. The compatibilized blend formed by the subject process is also provided.

18 Claims, No Drawings

PROCESS FOR PREPARING COMPATIBILIZED THERMOPLASTIC POLYMER BLENDS AND COMPOSITIONS THEREOF

CROSS-REFERENCE TO RELATED APPLICATION

This application is a continuation-in-part of U.S. patent application Ser. No. 565,790, filed Dec. 27, 1983, now abandoned.

BACKGROUND OF THE INVENTION

This invention relates to a process for preparing compatible thermoplastic polymer blends from two or more normally incompatible polymers. More particularly, this invention relates to blends of a first polymer containing pendant cyclic iminoether groups and another polymer containing coreactive groups which react with cyclic iminoether groups to form linkages between the polymers.

The reaction of cyclic iminoether ether groups, such as a 2-oxazoline ring, with a coreactive group, such as a free carboxyl or anhydride, is well known in the art. Such examples are disclosed in U.S. Pat. Nos. 4,508,869; 4,474,923; 4,247,671; 4,245,063; 3,535,291; and 3,509.235 and Japanese Publication KOHO No. 44-30384. While the basic ringopening reaction of 2-oxazoline is understood, it is still desirable to find novel ways to utilize this reaction.

One attempt to employ the crosslinking characteristic of 2-oxazoline with a carboxyl group is disclosed in U.S. Patent No. 3,509,235 to Riemhofer. Riemhofer discloses the preparation of thermosetting compositions having good film characteristics by employing the 2-oxazoline to obtain the desired degree of crosslinking. The crosslinking reaction takes place during the curing of the polymer mixture which is heated from 100° to 200° C.

Unlike Riemhofer, the subject polymer mixture is formed into a thermoplastic blend which can be reheated and molded over and over again. This is not possible with a thermoset which forms an irreversible solid upon curing. An additional advantage of the subject invention is that novel thermoplastic blends are prepared from normally incompatible polymers which heretobefore was not possible. That is, normally incompatible polymers are compatibilized by treating them such that they respectively contain 2-oxazoline groups and coreactive groups such that covalent bonds can be formed between them sufficient to compatibilize the incompatible polymers into a thermoplastic blend but insufficient to form undesirable amounts of crosslinking.

Often, it is desirable to blend polymers to take advantage of the individual component polymer characteristics. It is normally expected that polymer blends will have properties which are approximately the average of those of the component polymers. In other words, it is expected that blends of compatible polymers will exhibit mechanical properties, ESCR, moldability, thermoformability, and like properties which are intermediate to those of the component polymers.

In some situations, it is desirable to prepare polymer blends from component polymers which are incompatible. Unfortunately, polymer blends prepared from incompatible polymers exhibit poorer properties than the component polymers.

For example, monovinylidene aromatic polymers such as polystyrene are known to be incompatible with polyolefin polymers which would otherwise be advantageously blended therewith, Thus, most blends containing polystyrene and polyolefin polymers exhibit poorer properties than either of the component polymers.

Various methods have been proposed to prepare blends of normally incompatible polymers. Generally, these methods have focused on the use of grafting techniques or the use of a third component, a compatiblizing agent, in the blend. For example, in U.S. Pat. Nos. 4,386,187 and 4,386,188 it is taught to prepare blends of polyolefins and a polystyrene using a styrene/butadiene/styrene block copolymer. Compatibilizing agents which are ethylene/vinylacetate copolymers, ethylene/acrylic acid ester copolymers and ethylene/methacrylic acid ester copolymers have also been taught for use in preparing blends of polystyrene and polyolefins (see Japanesse Patent Announcement Kokai No. 48-43031/1973). Other such compatibilizing agents are taught in, for example, U.S. Pat. Nos. 4,188,432; 4,020,025; British Patent No. 1,363,463 and German Patent No. 241,375.

Unfortunately, these approaches to preparing compatible polymer blends often do not yield entirely satisfactory results. In many instances, the type and proportion of the component polymers which can be blended using these techniques is quite narrowly restricted. In addition, the inclusion of an additional component in the blend often has an adverse effect on the properties of the blend. Moreover, the blend achieved is still not as compatible as desired and, accordingly, the properties of the blend are generally not as good as expected.

Therefore, it is desirable to provide a blend of normally incompatible polymers in which improved compatibilization of the polymers and improved properties of the blend are achieved.

SUMMARY OF THE INVENTION

The present invention, in one aspect, is a process for preparing a compatibilized thermoplastic polymer blend from incompatible polymers comprising (a) treating one of said incompatible polymers whereby pendant cyclic iminoether groups are formed, (b) treating the other incompatible polymers whereby coreactive groups capable of reacting with pendant cyclic iminoether groups to form covalent bonds are formed thereon, and (c) blending the treated incompatible polymers whereby the pendant cyclic iminoether groups react with the coreactive groups to form a covalent bond which compatibilizes the thermoplastic blend. Generally, the incompatible polymers are treated such that from about 0.01 to about 10 percent by weight of the respective polymer contains the pendant cyclic iminoether group or coreactive group.

The coreactive groups are electrophilic groups containing an active hydrogen such as an amine, carboxylic acid, hydroxyl, mercaptan, epoxy, or anhydride group. The cyclic iminoether group is a 2-oxazoline group.

In one embodiment, styrene is treated such that pendant cyclic iminoether groups are formed thereon and an olefin having from about 2 to about 8 carbon atoms is treated such that corrective groups capable of reacting with the cyclic iminoether group to form covalent bonds is formed thereon. Generally, the olefin having from about 2 to about 8 carbon atoms is a polymer of ethylene and/or propylene.

In yet another embodiment, one of the treated polymers can be a copolymer of styrene and a 2-alkylene-2- oxazoline and the other incompatible polymer can be a copolymer of ethylene and an α,β-ethylenically unsaturated carboxylic acid. The 2-alkylene-2-oxazoline can be 2-isopropenol-2-oxazoline and the α,β-ethylenically unsaturated carboxylic acid can be acrylic acid.

In yet another aspect, the process comprises the utilization of incompatible polymers which normally contain the coreactive group, i.e., an electrophilic group containing an active hydrogen in the polymer chain and end groups thereof. The electrophilic group is an amine, carboxylic acid, hydroxyl, mercaptan, epoxy or anhydride group.

The present invention further provides for a thermoplastic polymeric blend prepared by the processes mentioned above.

The subject invention provides an advantage of being able to compatiblize normally incompatible polymers to form a blend having properties at least intermediate to the component polymers. Therefore, the blends of this invention can be prepared using a wide range of polymer components as well as a variety of types of polymer components.

DETAILED DESCRIPTION OF THE INVENTION

Thermoplastic polymer blends of this invention are prepared from polymer components which are generally incompatible. The incompatible Polymer components are compatibilized by the formation of covalent bonds between the incompatible polymers. The bonding is provided by a pendant cyclic iminoether group present on one of the incompatible polymers which reacts with a coreactive group, such as a carboxyl or anhydride, present on the other incompatible polymer.

The term "blend" as employed herein refers to those solid mixtures of two or more polymers which are commonly referred to in the art as polymer blends or polymer alloys.

The term "compatible blend" as employed herein, is used to describe a blend which exhibits properties, especially physical properties, which are essentially intermediate to those of the component polymers, or better. In contrast, an "incompatible blend" as used herein, refers to a blend which exhibits properties which are significantly poorer than those of the component polymers. That is, a blend prepared from incompatible polymers will have physical properties worse than the component polymers.

The term "thermoplastic" is employed in the traditional sense as meaning a polymer that softens when exposed to heat and returns to its original condition when cooled to room temperature, i.e., remoldability. In contrast, a thermoset is a polymer which solidifies or sets irreversibly when heated. The thermoset property is associated with a high degree of crosslinking of the polymeric constituents induced by heat or radiation. This high degree of crosslinking associated with thermosets is undesirable when preparing thermoplastics which are to be remolded or shaded with heat. Therefore, it is critical in the preparation of the subject thermoplastic polymer blends that the crosslinking between the cyclic iminoether groups and corresponding coreactive groups employed to compatibilize the incompatible polymers not be excessive such that the thermoplastic nature of the resulting blend is lost.

The blends of this invention are prepared from incompatible polymers where one of the incompatible polymers is treated such that it contains repeating units having pendant cyclic iminoether groups. Said cyclic iminoether group is present in a compatibilizing amount, i.e., an amount which is at least sufficient to render the polymer compatible with the other incompatible polymer employed herein. Of course, the amount of cyclic iminoether group which is required to compatibilize the incompatible polymers depends somewhat on the particular polymer employed, the relative amount thereof present in the blend and the amount of coreactive groups present on the other incompatible polymer. However, in general, a compatibilizing amount of said cyclic iminoether group is present when the repeating units containing said cyclic iminoether group comprise at least about 0.01 weight percent of the polymer.

Since, as described more fully hereinafter, the cyclic iminoether group apparently forms a linkage with the coreactive group on the other incompatible polymer, it is readily seen that the degree of crosslinking and the molecular weight of the polymers of the blend can also be controlled with the proportion of cyclic iminoether and coreactive groups present in the blend. In fact, it is important that the amounts of such groups in the blend, be controlled in order that crosslinked thermoplastic blends can be prepared. Conversely, an excessive amount of both groups will result in a very highly crosslinked thermosetting material. Therefore, it is essential for the preparation of thermoplastic blends that the amount of cyclic iminoether group in one polymer and coreactive groups on the other polymer be sufficient to compatibilize the polymers in the blend. Most typically, the first polymer contains from about 0.01 to 10 in weight percent of repeating units containing pendant cyclic iminoether groups. More preferably, the first polymer contains from about 0.1 to about 5 weight percent of such repeating units.

Generally, the amount of cyclic iminoether groups employed is less than 5 weight percent in order to insure the formation of a thermoplastic blend. However, where very small amounts of coreactive groups are present it can be desirable to employ more than 5 weight percent cyclic iminoether groups. It is of course understood that not all of the reactive groups present, i.e., cyclic iminoether groups and coreactive groups, will react due to the nature of the incompatible polymer components to resist interaction. This can be contrasted with compatible polymers which would interact very well and; therefore, present more opportunity for pendant reactive groups to interact and form covalent bonds.

The subject cyclic iminoether groups are structurally depicted as follows:

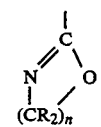

wherein each R is independently hydrogen, or an inertly substituted hydrocarbon containing 1 to 18 carbon atoms; and n is a number from about 1 to about 5. Said cyclic iminoether group can be attached to the polymer chains through any of the carbon atoms in the ring. Preferably, the cyclic iminoether is a 2-iminoether, i.e., is attached to the polymer chain through the 2-carbon atom to yield a structure as as defined above. Preferably, each R is hydrogen or lower alkyl and n is 1, 2 or 3. Most preferably, each R is hydrogen, n is 2 and the cyclic iminoether is a 2-oxazoline group. By "inertly substituted" it is meant that the referenced group contains no functional group which interferes with the polymerization or curing of the oxazoline group.

Polymers containing repeating units having pendant cyclic iminoether groups are advantageously prepared by the polymerization of a monomer mixture comprising an ethylenically unsaturated monomer containing a cyclic iminoether group. Preferably, such monomer is a 2-alkenyl-2-oxazoline wherein said alkenyl group contains from about 2 to about 8, preferably 2 to 4 carbon atoms. Most preferably, said monomer is 2-isopropenyl-2-oxazoline.

Polymers containing the pendant cyclic iminoether groups are reacted with the incompatible polymers containing coreactive groups to obtain a compatibilized polymer blend thereof. The coreactive group may be pendant to the other polymer, may form terminal groups thereon or may be incorporated into the polymer backbone thereof. Coreactive groups are electrophilic groups containing an active hydrogen such as an amine, carboxylic acid, hydroxyl, mercaptan, epoxy, or anhydride group. Polymers containing coreactive groups along the polymer backbone include, for example, polyamines, such as the diverse polyalkylene amines; and the like. Polymers containing terminal coreactive groups include, for example, diverse polysulfides (Thiokols), epoxy resins and polyalkylene glycols.

Generally, polymers containing pendant coreactive groups are derived from an addition polymerizable monomer containing the desired coreactive group. Preferred, are polymers having repeating units derived from $\alpha,\beta$-ethylenically unsaturated monomers containing said coreactive groups Examples are polymers of unsaturated carboxylic acids such as acrylic acid, methacrylic acid, itaconic acid, maleic acid and the like; unsaturated amines such as vinylamine and the like and epoxy groups such as oxarane. In addition, polymers of other monomers which can be chemically modified to form pendant coreactive groups in the polymers, such as acrylonitrile, are usefully employed herein.

The incompatible polymer contains at least a sufficient amount of coreactive groups to compatibilize itself with other polymer containing the cyclic iminoether group. As stated hereinbefore, a compatibilizing amount of said coreactive group will depend on the particular polymers employed in the blend as well as the relative proportions of said polymers in the blend and the amount of the iminoether groups present. However, as with the iminoether group, a compatibilizing amount of the coreactive group is typically present when at least about 0.01 weight percent of the repeating units of the polymer contain coreactive groups. When said coreactive group is an interval part of the structure of the polymer backbone, as many as 100 weight percent of such repeating units in the other polymer may contain coreactive groups. Typically, when said coreactive group is a pendant group incorporated into the copolymer for the primary purpose of compatibilizing the blends of this invention, it is preferred that the repeating units containing said coreactive groups comprise from about 0.01 to about 10, more preferably from about 0.1 to about 5, weight percent of the polymer.

Thus, in the preparation of the subject thermoplastic polymer blend from normally incompatible polymers one of the polymeric components must be a polymer of a monomer which (a) can be modified to contain pendant cyclic iminoether groups, or (b) can be copolymerized with a monomer which contains or can be modified to contain a pendant cyclic iminoether group. In the preferred embodiment, the polymer is advantageously a polymer of an addition polymerizable monomer copolymerizable with a monomer of an ethylenically unsaturated cyclic iminoether.

Representative polymers of said addition polymerizable monomers are polymers of a lower alkene, particularly a $C_1$–$C_8$ alkene, more particularly, ethylene or propylene as well as copolymers thereof; a conjugated diene such as butadiene or isoprene as well as copolymers thereof; a vinylidene halide such as vinylidene chloride or copolymers thereof; vinyl acetate; an ether of an $\alpha,\beta$-ethylenically unsaturated carboxylic acid such as alkyl esters of acrylic or methyl acrylic acid and copolymers thereof; a monovinylidene aromatic compound such as styrene, vinyltoluene, t-butyl styrene, vinylnaphthalene and the like. Ethylenically unsaturated cyclic iminoethers, in particular 2-alkenyl-2-oxazolines, generally resemble styrene in their polymerization reactions. Accordingly, as a rule of thumb, polymers of monomers which are copolymerizable with styrene will generally be usefully employed herein. Due to the polymerization reactions of 2-alkenyl-2-oxazolines and the tendency for styrenic polymers to be incompatible with a wide range of other thermoplastic materials, it is preferred that the first polymer be a polymer of a 2-alkenyl-2-oxazoline and styrene, especially 2-isopropenyl-2-oxazoline and styrene.

Additionally, in the preparation of the subject thermoplastic polymer blend from normally incompatible polymers the other polymeric component must contain or be modified to contain a coreactive group as described hereinbefore. In order to be useful herein said polymer is generally a copolymer of an addition polymerizable monomer which contains said coreactive group or which can be treated subsequent to polymerization to impart said coreactive group thereto. For example, any of the aforementioned addition polymers can be copolymerized with an addition polymerizable carboxylic acid to impart carboxyl groups to the polymer. Amino groups, amide groups and like coreactive groups can be imparted to the polymer in similar manner by copolymerizing a monomer mixture containing the desired proportion of an addition polymerizable monomer containing such group. Also, graft or block copolymers wherein at least one of the grafted segments or blocks contain a reactive group can be employed herein.

Polymers of certain monomers such as vinyl or vinylidene halide or acrylonitrile can be modified after the polymerization thereof to impart coreactive moieties thereto. For example, vinyl chloride can be reacted with ammonia or a primary amine to place pendant amine groups on the polymer. Similarly, acrylonitrile can be hydrogenated after its polymerization to form pendant amine groups.

Certain other polymers which normally contain coreactive groups may be employed herein which will avoid the step of having to treat the polymer to provide the coreactive group. For instance, polymers which naturally have an electrophilic group containing an active hydrogen in the polymer chain or end groups thereof are suitable. For example, polymers containing repeating amine linkages, such poly(ethyleneimine) or a partially hydrolyzed poly(2-alkyl-2-oxazoline) are suitable as the other polymer herein. Other suitable polymers include those which contain amine, carboxylic acid, hydroxyl, epoxy, mercaptan, anhydride and like groups in the polymer chain or as end groups thereof.

For polymers which do not normally contain coreactive groups it is generally desirable to prepare them with only relatively small amounts of said coreactive groups. This is because it is usually desirable to minimize the effect of the coreactive group or monomers containing said coreactive group on the physical properties of such a polymer. The presence of large amounts of certain reactive groups, such as acid groups, can cause the blend to have certain undesirable properties such as water-sensitivity, adhesion to mold and corrosion of molds. It is usually desirable to employ a coreactive group containing polymer having physical characteristics similar to those of the polymer which does not contain coreactive groups. For example, a copolymer of ethylene and acrylic acid can be employed. In order to make the properties of said ethylene/acrylic acid polymer resemble those of polyethylene as closely as possible, it is generally desirable to employ an ethylene acrylic acid copolymer having an acrylic acid content not greatly in excess of that required to compatibilize the blends.

The blends of this invention are advantageously prepared from the incompatible component polymers by conventional melt blending or solution blending techniques. Melt blending is advantageously performed by heating each polymer to a temperature about its softening point and thoroughly mixing the softened polymers. Solution blending is performed by dissolving each component polymer into a common solvent and precipitating the dissolved polymers therefrom. Melt blending is the preferred method of preparing the blends of this invention.

Although it is not intended to limit the invention to any theory, it is believed that the compatibility of the blends of this invention is due to the reaction of said coreactive and iminoether groups present therein. Said coreactive and iminoether groups are believed to react to form covalent linkages between said first and other polymer, thereby overcoming the normal tendency of the polymers to resist the formation of a compatible blend.

Since crosslinkages between the polymers are present in the blends of this invention, it is apparent that presence of linking groups on each polymer can also be used as a control on the rheological and thermoplastic properties of the blends. Since the presence of such linking groups increase the molecular weight of the polymers in the blends, increasing the amounts of such linkages enables the practitioner to prepare more viscous, stronger materials by further increasing the amount of linkage in the blends. Thus, the blend can be converted into a thermosetting rather than a thermoplastic material. Therefore, in order to maintain a thermoplastic polymer blend, the crosslinking density must be controlled by adjusting the amounts of cyclic iminoether groups and coreactive groups present in the blend.

Typically the formation of said linkages is achieved by the application of a moderate amount of heat to the blends. The amount of heat required is typically dependent on the particular coreactive group employed. In general, carboxylic acid groups are more reactive than amide, amine or hydroxyl groups and therefore require lower temperatures to form such crosslinkages. Usually, when a hot blending technique is employed to form the blends, the temperature at which the melt blending is performed is generally sufficient to cause the formation of linkages therein. Generally, and especially when the coreactive group is a carboxylic acid, such linkages are formed in one minute or less at the temperatures used to melt blend the polymers. It may be desirable to incorporate into the blend a catalyst which increases the rate of the reaction between the iminoether and coreactive group. Lewis acids such as zinc chloride or iron chloride are suitable as such catalysts. In addition, it may be desirable to include a plasticizer or lubricant in the blends in order to facilitate the iminoether and coreactive groups contacting each other in the blending process. However, the inclusion of either a catalyst, plasticizer or lubricant is optional herein.

An advantage of the Present invention is that the formation of links in the blends of this invention is accomplished without the formation of any by-products and without the formation of ionic links. Unlike most curable systems, in which water, ammonia, or alcohol or other condensation product is formed in the curing reaction, the formation of links in this invention does not create such by-products. Accordingly, the links are formed in these blends without the undesirable formation of vaporous condensation products and without introducing such condensation products as impurities in the blends. The use of ionic crosslinks is also undesirable because such ionic crosslinks are often sensitive to pH, water and electrolytes and render the blends somewhat hydrophilic.

The blends of this invention may be employed in most applications for which the component polymers are suitable. Said blends may be employed to form shaped articles of all types as well as for films for packaging and like usages.

The following examples are provided to illustrate the invention but not to limit the scope thereof. All parts and percentages are by weight unless otherwise indicated.

EXAMPLE 1

In a Brabender mixer heated to about 220° C. are softened 25 grams (g) of an ethylene acrylic acid (EAA) copolymer (9 percent by weight repeating acrylic acid units). To the softened EAA polymer is added 25 g of a styrene/2-isopropenyl-2-oxazoline (SIPO) copolymer containing 1 percent by weight repeating isopropenyl oxazoline (IPO) units. Mixing is continued until a homogeneous appearing blend is obtained.

The heat distortion temperature, heat distortion temperature under load, tensile strength, tensile modulus, elongation of break, notch impact strength and melt flow of the resulting blend are determined in conventional manner and are reported as Sample No. 1 in Table I following. For comparing corresponding values for the component polymers, the EAA copolymer used in preparing the blend and a commercially available polystyrene are obtained and reported in Table I following. Additionally, a 50/50 blend of the EAA copolymer and polystyrene not containing IPO units was prepared for comparison to Sample No. 1.

TABLE I

| Sample | Sample No. 1 | PS[1] | EAA[2] | PS-EAA[3] |
|---|---|---|---|---|
| Heat Distortion[4] Temperature (°F.) | 190 | 220 | 170 | 185 |

TABLE I-continued

| Sample | Sample No. 1 | PS[1] | EAA[2] | PS-EAA[3] |
|---|---|---|---|---|
| Heat Distortion Under[5] Load (264 psi) (°F.) | 126 | 210 | ND | ND |
| Tensile Strength (psi)[6] | 2,900 | 5,200 | 1,100 | 700 |
| Tensile Modulus (psi)[7] | 60,000 | 420,000 | <10,000 | 60,000 |
| Elongation (%)[8] | 50 | 2 | >150 | 2 |
| Impact Strength (ft.-lb./in.)[9] | 10 | 0.2 | NB | 1.0 |
| Melt flow (g/10 min.)[10] | 1.7 | 7 | ND | 41.0 |

ND - Not Determined.
NB - Sample does not break, therefore no value is obtained.
[1]$M_n = 200,000$.
[2]Ethylene/Acrylic acid copolymer.
[3]Blend of polystyrene, $M_n = 200,000$ and ethylene/acrylic acid copolymer.
[4]ASTM D1525
[5]ASTM D648
[6-8] ASTM D638
[9]ASTM D256
[10]ASTM D1238

It is readily seen from the data presented in Table I that a compatible blend of the SIPO and EAA polymer is achieved. Polymer compatibility is indicated by elongation, impact strength and (to a lesser extent) tensile properties; whereas, other properties such as heat distortion temperature or tensile modulus show minor differences between compatible and incompatible blends. The subject compatibilized blend of this invention, in contrast to the blend of polystyrene and EAA copolymer, exhibits notably better tensile, elongation and impact strength properties.

In order to monitor the formation of linkages between the SIPO and EAA polymers, torque measurements are made while mixing varying EAA and SIPO polymers in a Brabender as described hereinbefore. As a control, a torque measurement is made on a 50/50 blend of polystyrene and an EAA (3 percent acrylic acid) polymer. Upon adding the polystyrene to the softened EAA polymer, the torque exerted by the blend abruptly increases due to the presence of unsoftened polystyrene in the system. As the polystyrene softens and is blended with the EAA polymer, the torque steadily decreases into a constant value of about 120 meter.-grams is reached. This blend is incompatible as exhibited by poor physical properties.

In like manner, the torque exerted by a 50/50 blend of the same EAA polymer and a SIPO polymer containing 0.2 percent repeating IPO units is determined. The torque exerted in preparing the blend is essentially the same as that of the control, indicating that the crosslinkages formed between the SIPO and EAA polymers do not significantly affect the general rheology of the blend. However, tensile testing indicates that the blend has significantly improved physical properties as compared to the control indicating that sufficient linkages between the EAA and SIPO polymers are formed to compatibilize the blend.

A third valuation is run, this time employing a 1 percent IPO/SIPO polymer. This time, the blended polymers exhibits a torque of 160 meter.grams indicating significant crosslinkages between the EAA and SIPO polymers occur.

A fourth evaluation is run, this time employing a 50/50 blend of an EAA polymer containing 6.5 percent acrylic acid units and a 1 percent IPO/SIPO polymer. After the IPO polymer is melted and blended with the EAA, the torque exerted by the blend exhibits a constant value of about 180 meter grams, indicating that a still greater amount of linkages are formed between the component polymers.

A fifth evaluation is run employing 25 g of the same EAA polymer as used in the fourth evaluation, 16 g of a 5 percent IPO/SIPO polymer and 9 g of a 10 percent IPO/SIPO polymer. The torque exhibited by the blend reaches a constant value of about 230 meter.grams.

A sixth evaluation is run employing a 50/50 blend of a 9 percent acrylic acid, ethylene acrylic acid polymer and a 10 percent IPO/SIPO polymer. This time the torque exerted by the blend reached a maximum as the SIPO is added, falls to a minimum value of about 300 meter.grams as the SIPO softens and then gradually rises to about 400 meter.grams as linkages between the EAA and the SIPO polymers form.

To further vary the formation of linkages between the SIPO and the EAA polymers, a blend of a 2.5 percent IPO/SIPO polymer and a 10 percent acrylic acid EAA polymer is prepared by melt-blending. This blend is studied by infrared variable temperature techniques by heating the blend from ambient temperature to about 200° C. in hot orthodichlorobenzene while periodically taking infrared scans of the heated blend. The initial cool system exhibits infrared peaks corresponding to the presence of dimerized (COOH) groups and oxazoline rings as well as a small proportion of amide ester groups. As the blend is heated, the diamerized $(COOH)_2$ and oxazoline peaks diminish while the amide ester peaks increase in intensity indicating that the carboxyl and oxazoline groups are reacting to form amide ester groups. Upon heating the sample, the amide ester peak does not significantly decrease in intensity indicating that the amide ester linkages are permanent and stable.

EXAMPLE 2

In a Brabender mixer equipped with a torque measuring apparatus is softened at 220° C. 75 parts of high density polyethylene/maleic anhydride graft copolymer (HDPE/MA) containing 1 percent by weight maleic anhydride units. To the softened HDPE/MA polymer is added 25 parts SIPO polymer containing 1 percent IPO units. Upon adding the SIPO polymer, the torque exerted by the blend increases. The torque then decreases as the SIPO is softened and blended and slightly increases again as crosslinkages between the SIPO and HDPE/MA polymers form and then reaches a constant value to about 270 meter grams. A sample of the resulting blend is compression molded at 160° C. and 10,000 psi for 3 minutes. The notch impact strength of the molded sample is measured and found to be 0.874 ft.-lb./in.

The foregoing experiment is repeated, this time using 30 parts SIPO and 70 parts HDPE/MA. The torque exerted by the blend follows a pattern similar to that of the previous sample reaching a constant value of about 280 ft.-lb./in. the notched impact strength of this blend is 0.532 ft.-lb./in.

The experiment is again repeated, this time using 35 parts SIPO polymer and 65 parts HDPE/MA polymer. Again a similar torque pattern is seen with the torque reaching a final constant value of about 280 meter.-grams. The notched impact strength of this sample is 0.487 ft.-lb./in.

Another blend containing 70 percent HDPE/MA polymer and 30 percent SIPO polymer is prepared in like manner except 0.2 percent zinc chloride is added to the blend to promote the formation of crosslinks between the polymers. Mechanical testing of molded samples of this blend are conducted with results as reported in Table II following. Comparison properties are also reported for the component polymers and an unmodified 70 HDPE/30 PS blend.

TABLE II

| Sample | HDPE/MA SIPO[1] | PS[2] | HDPE[3] | 70 HDPE[3]/ 30 PS[2] |
|---|---|---|---|---|
| Heat Distortion[4] Temperature (°F.) | 250 | 220 | 260 | 246 |
| Heat Distortion Under[5] Load (264 psi) (°F.) | 149 | 210 | 127 | 150 |
| Tensile Strength (psi)[6] | 4,200 | 5,200 | 4,400 | 2,900 |
| Tensile Modulus (psi)[7] | 240,000 | 420,000 | 150,000 | 240,000 |
| Elongation (%)[8] | 70 | 2 | >150 | 2 |
| Impact Strength (ft.-lb./in.)[9] | 2–6 | 0.2 | 2.6 | 0.3 |
| Melt Flow[10] | 0.6 | 7 | 0.8 | 10.0 |

[1] 70 percent high density polyethylene grafted with 1 percent maleic anhydride polymer; 30 percent styrene/isopropenyl oxazoline copolymers containing 1 percent isopropenyl oxazoline units.
[2] Polystyrene, Mn = 200,000.
[3] High density polyethylene
[4] ASTM D1525
[5] ASTM D648
[6-8] ASTM D638
[9] ASTM D256
[10] ASTM D1238

As can be seen from the data presented in Table II, excellent mechanical properties are exhibited by this blend. By comparing the properties of the blend of those with polystyrene and high density polyethylene, it is seen that the blend exhibits properties which are generally intermediate to those of the polystyrene and HDPE. In contrast, the unmodified 70 HDPE/30 PS blend exhibited poorer tensile, elongation and impact strength than the subject compatibilized blend.

EXAMPLE 3

Four blends of a 75 percent styrene/24 percent acrylonitrile/1 percent IPO terpolymer (SANIPO) and a 94 percent propylene/6 percent acrylic acid copolymer (PAA) are prepared in a Brabender mixer at the proportions indicated in Table III following. Two of the blends also contain 0.6 percent zinc chloride. As a control, a blend of polystyrene and the PAA polymer is also prepared. Torque measurements at the blend are made as a measure of the compatibility of the blends.

TABLE III

| Sample No. | %[1] SANIPO | %[2] PAA | % PS[3] | % ZnCl[4] | Torque[5] (meter · grams) |
|---|---|---|---|---|---|
| III-A | 80 | 20 | — | 0 | 410 |
| III-B | 70 | 30 | — | 0 | 290 |
| III-C | 70 | 30 | — | 0.6 | 290 |
| III-D | 60 | 40 | — | 0.6 | 270 |
| III-E* | — | 30 | 70 | 0 | 150 |

*Not an example of this invention.
[1] Percent by weight Styrene/acrylonitrile/IPO (75/24/1) terpolymer.
[2] Percent by weight propylene acrylic acid (94/6) copolymer.
[3] Percent by weight polystyrene.
[4] Percent by weight zinc chloride catalyst.
[5] Measured on a Brabender apparatus.

In the control (Sample No. III-E) the polystyrene and PAA polymers resist blending due to the mutual incompatibility thereof. The resulting blend is a stringy mixture exhibiting poor plastic properties. By contrast, each of Sample Nos. III-A through III-D exhibit good plastic properties evidencing a compatibilization of the component polymer. The increased torque measurement for Sample Nos. III-A–III-D as compared with Sample No. III-E indicate increased compatibility between the compared polymers.

EXAMPLE 4

In a Brabender mixer is softened at 220° C. 75 parts of a SIPO (1 percent IPO) copolymer. To the softened SIPO is added 25 parts of a carboxylated polyester resin, sold as Vitel VPE6434 The blending is continued until the blend assumes a homogeneous appearance. Torque measurements made during the blending indicate that crosslinkages are formed between the component polymers during blending. The torque exerted by the blend reaches a final constant value of about 170 meter.grams.

For comparison, this experiment is repeated this time substituting 75 parts polystyrene for the SIPO polymer. Torque measurements show no formation of linkages between the polymers The final torque reading is only 90 meter.grams.

EXAMPLE 5

In this example, blends of a vinylidene chloride/methacrylic acid copolymer (1 percent methacrylic acid) are prepared with diverse other polymers.

35 parts polystyrene are softened on a Brabender mixer at 220° C. To the softened polymer are added 65 parts of vinylidene chloride/methacrylic acid copolymer. Torque measurements indicate the formation of no crosslinkages between the polymers. Substitution of a 1 percent IPO SIPO copolymer polystyrene results in the formation of substantial amounts of linkages between the component polymers. Similarly, substitution of 15 percent chlorinated polyethylene and 20 percent of a 1 percent IPO SIPO copolymer for the polystyrene again provides a blend in which linkages between the component polymers are formed.

The foregoing experiment is again repeated, this time employing in place of the polystyrene a coagulated methyl methacrylate ethylacrylate latex which has been coagulated to powdered form Viscosity measurements made during blending indicated no formation of crosslinks between these polymers. However, when a methyl methacrylate/ethylacrylate/acrylic acid/IPO polymer is employed, viscosity measurements during the blending clearly indicate the formation of linkages between the polymers and the resulting blend is a compatible blend exhibiting good physical properties

EXAMPLE 6

In this example, the effect of adding a ZnCl catalyst to a blend of 99 percent styrene/1 percent IPO copolymer (SIPO) and ethylene vinyl alcohol (EVA) was evaluated A 50/50 blend of SIO/EVA was prepared in a Brabender mixer and the torque measurements monitored. After three minutes of blending, the torque of the blend was 220 meter.grams and then 0.6 g of ZnCl was added whereupon the torque increased to 280 meter grams which indicated that crosslinking had occurred.

The increase in torque indicates that the catalyst was necessary to increase the rate of reaction between the iminoether group and coreactive group. In contrast, Table III indicates that the presence of a catalyst had very little effect on the rate of reaction between the iminoether group and coreactive group Therefore, depending upon the nature of the groups, it may be desirable to employ a catalyst.

What is claimed is:

1. A process for preparing a compatibilized thermoplastic polymer blend from incompatible polymers comprising:
    (a) treating one of said incompatible polymers whereby pendant cyclic iminoether groups are formed thereon;
    (b) treating the other of said incompatible polymers whereby coreactive groups capable of reacting with said pendant cyclic iminoether groups to form covalent bonds are formed thereon;
    (c) blending said treated incompatible polymers whereby said pendant cyclic iminoether group reacts with said coreactive group to form a covalent bond thereby resulting in a compatible thermoplastic blend.

2. The process of claim 1 where said incompatible polymers are treated such that from about 0.01 to about 10 percent by weight of said respective polymers contain said pendant cyclic iminoether group or coreactive group.

3. The process of claim 2 where said incompatible polymers are treated such that from about 0.1 to about 5 percent by weight of said respective polymers contain said pendant cyclic iminoether group or coreactive group.

4. The process of claim 1 where said coreactive group is an electrophilic group containing an active hydrogen.

5. The process of claim 4 where said electrophilic group is an amine, carboxylic acid, hydroxyl, mercaptan, epoxy or anhydride group.

6. The process of claim 1 where said cyclic iminoether group is a 2-oxazoline group.

7. The process of claim 1 wherein said polymer of step (a) is a polymer of styrene and said polymer of step (b) is a polymer of an olefin having from about 2 to about 8 carbon atoms.

8. The process of claim 7 wherein said polymer of an olefin having from about 2 to about 8 carbon atoms is selected from the group consisting of a polymer of ethylene, a polymer of ethylene and propylene, and a polymer of propylene.

9. The process of claim 1 wherein said treated polymer of step (a) is a copolymer of styrene and a 2-alkenyl-2-oxazoline and said treated polymer of step (b) comprises a copolymer of ethylene and an $\alpha,\beta$-ethylenically unsaturated carboxylic acid.

10. The process of claim 9 wherein said 2-alkenyl-2-oxazoline is 2-isopropenyl-2-oxazoline and said $\alpha,\beta$-ethylenically unsaturated carboxylic acid is acrylic acid.

11. The process of claim 1 wherein said polymer of step (a) is a polymer of styrene and said polymer of step (b) comprises a polymer of a vinyl halide.

12. The process of claim 1 wherein said treated polymer of step (a) is a polymer of styrene and a 2-alkenyl-2-oxazoline and said treated polymer of step (b) comprises a polymer of vinylchloride and an $\alpha,\beta$-ethylenically unsaturated carboxylic acid.

13. The process of claim 12 where said a 2-alkenyl-2-oxazoline is 2-isopropenyl-2-oxazoline and said $\alpha,\beta$-ethylenically unsaturated carboxylic acid is acrylic acid.

14. A process for preparing a compatibilized thermoplastic polymer blend from incompatible polymers comprising (a) treating one of said incompatible polymers whereby pendant cyclic iminoether groups are formed thereon and (b) blending the incompatible polymer of (a) with the other of said incompatible polymers having coreactive groups capable of reacting within said pendant cyclic iminoether groups to form covalent bonds whereby said pendant cyclic iminoether group reacts with said coreactive group to form a covalent bond thereby resulting in a compatible thermoplastic blend.

15. The process of claim 14 where said incompatible polymer is a polymer having a coreactive group comprising an electrophilic group containing an active hydrogen in the polymer chain or end groups thereof.

16. The process of claim 15 where said electrophilic group is an amide, carboxylic acid, hydroxyl, mercaptan, epoxy or anhydride group.

17. A thermoplastic polymeric blend prepared by the process of claim 1.

18. A thermoplastic polymeric blend prepared by the process of claim 14.

* * * * *

UNITED STATES PATENT AND TRADEMARK OFFICE
CERTIFICATE OF CORRECTION

PATENT NO. : 4,864,002

DATED : September 5, 1989

INVENTOR(S) : James E. Schuetz; Ronald W. Hohlfeld; Brenda C. Meridith

It is certified that error appears in the above-identified patent and that said Letters Patent is hereby corrected as shown below:

Column 1, line 25, "3,509.235" should read "3,509,235"; and at line 27, "ringopening" should read "ring-opening".

Column 3, line 28, "Polymer" should read "polymer"; and at line 59, "shaded" should read "shaped".

Column 5, line 36, "groups Examples" should read "groups. Examples"; and at line 56, "interval" should read "integral".

Column 7, line 12, "groups,can" should read "groups, can".

Column 8, line 16, "Present" should read "present".

Column 9, line 17, "$^1M_n$ = 200,000." should read as "$^1$Polystyrene, $M_n$ = 200,000."; and at line 60, "valuation" should read "evaluation".

Column 10, line 2, "meter gram" should read "meter·gram"; line 28, "(COOH)" should read "$(COOH)_2$"; and at line 52, "meter grams." should read "meter·grams."

Column 12, line 16, "VPE6434 The" should read "VPE6434. The"; line 26, "polymers The" should read "polymers. The"; line 48, "form Viscosity" should read "form. Viscosity"; line 61, "evaluated A 50/50 blend of SIO/EVA" should read "evaluated. A 50/50 blend of SIPO/EVA"; and at line 65, "meter grams" should read "meter·grams".

Column 13, line 12 beginning "iminoether groups are formed thereon;" should follow after the word "cyclic".

UNITED STATES PATENT AND TRADEMARK OFFICE
CERTIFICATE OF CORRECTION

PATENT NO. : 4,864,002

DATED : September 5, 1989

INVENTOR(S) : James E. Schuetz; Ronald W. Hohlfeld; Brenda C. Meridith

It is certified that error appears in the above-identified patent and that said Letters Patent is hereby corrected as shown below:

Column 14, line 40, "amide" should read --amine--.

Signed and Sealed this

Twenty-fifth Day of December, 1990

Attest:

HARRY F. MANBECK, JR.

*Attesting Officer*     *Commissioner of Patents and Trademarks*